United States Patent
Dunsbergen et al.

(10) Patent No.: US 9,510,136 B2
(45) Date of Patent: Nov. 29, 2016

(54) ACCESS CONTROL IN BLUETOOTH® LOW ENERGY DEVICES

(71) Applicant: Aruba Networks, Inc., Sunnyvale, CA (US)

(72) Inventors: Ben Dunsbergen, San Jose, CA (US); Kiyo Kubo, Oakland, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 18 days.

(21) Appl. No.: 14/529,930

(22) Filed: Oct. 31, 2014

(65) Prior Publication Data

US 2016/0128112 A1    May 5, 2016

(51) Int. Cl.
*H04W 4/00*     (2009.01)
*H04W 76/02*    (2009.01)
*H04W 84/18*    (2009.01)

(52) U.S. Cl.
CPC ............ *H04W 4/008* (2013.01); *H04W 76/02* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2005/0021985 A1 | 1/2005 | Ono et al. | |
| 2005/0233789 A1 | 10/2005 | Maekawa | |
| 2008/0114687 A1 | 5/2008 | Watanabe et al. | |
| 2013/0109323 A1* | 5/2013 | Ruutu | H04B 5/0031 455/68 |
| 2014/0072117 A1 | 3/2014 | Barinov | |
| 2014/0220897 A1* | 8/2014 | Wan | H04W 8/005 455/41.2 |
| 2014/0229588 A1 | 8/2014 | Hjelm et al. | |
| 2015/0066762 A1* | 3/2015 | Chatterton | G06Q 20/42 705/44 |
| 2015/0172391 A1 | 6/2015 | Kasslin et al. | |

FOREIGN PATENT DOCUMENTS

| | | |
|---|---|---|
| JP | H10-283270 A | 10/1998 |
| JP | H11-352881 A | 12/1999 |
| JP | 2002-260326 A | 9/2002 |
| JP | 2007-174682 A | 7/2007 |
| JP | 2007-242231 A | 9/2007 |
| JP | 2008-124649 A | 5/2008 |
| WO | WO-2005/103907 A1 | 11/2005 |

OTHER PUBLICATIONS

Notice of Allowance, U.S. Appl. No. 14/634,572, Date: May, 28, 2015, pp. 1-19.

(Continued)

*Primary Examiner* — Alejandro Rivero
(74) *Attorney, Agent, or Firm* — Brooks, Cameron & Huebsch, PLLC (57) ABSTRACT

A computer readable medium comprising instructions which, when executed, cause performance of operations comprising: successfully establishing a Bluetooth connection between a Bluetooth Low Energy (BLE) device and another device, receiving, by the BLE device from the other device, a request for a change in a configuration, determining, by the BLE device, if the BLE device is in a configuration-changes-enabled state, responsive to determining that the BLE device is in a configuration-changes-enabled state, changing the configuration based on the request, and responsive to determining that the BLE device is not in a configuration-changes-enabled state, refraining from changing the configuration.

18 Claims, 6 Drawing Sheets

(56) References Cited

OTHER PUBLICATIONS

Notice of Allowance, U.S. Appl. No. 14/634,624, Date: Nov. 24, 2015. pp. 1-9.

* cited by examiner

ACCESS CONTROL IN BLUETOOTH® LOW ENERGY DEVICES

BACKGROUND

Control of access to configuration settings is an important factor in securing networks and/or devices from unwanted changes, access, and/or hackers. Depending on the components, usage, and type of device which the configuration settings are associated with, many potential solutions to this problem exist, ranging from simple to complex. However, in some situations, there are gaps in the available security options. Thus, additional solutions are required.

SUMMARY

In general, in one aspect, the invention relates to a non-transitory computer readable medium comprising instructions which, when executed by one or more hardware processors, causes performance of operations comprising: successfully establishing a Bluetooth connection between a first Bluetooth Low Energy (BLE) device and a second device; receiving, by the first BLE device from the second device, a first Bluetooth signal comprising a request for a change in a configuration; determining, by the first BLE device, if the first BLE device is in a configuration-changes-enabled state; responsive to determining that the first BLE device is in a configuration-changes-enabled state, changing the configuration based on the request; and responsive to determining that the first BLE device is not in a configuration-changes-enabled state, refraining from changing the configuration.

In general, in one aspect, the invention relates to a non-transitory computer readable medium comprising instructions which, when executed by one or more hardware processors, causes performance of operations comprising: successfully establishing a Bluetooth connection between a first Bluetooth Low Energy (BLE) device and a second device; responsive to determining that a particular access code is received within a particular period of time from establishing the Bluetooth connection: at least temporarily maintaining the Bluetooth connection; and responsive to determining that the particular access code is not received within a particular period of time from establishing the Bluetooth connection: terminating, by the first BLE device, the Bluetooth connection between the first BLE device and the second device.

In general, in one aspect, the invention relates to a system comprising: a first Bluetooth Low Energy (BLE) device, configured to: successfully establish a Bluetooth connection with a second device; receive, from the second device, a first Bluetooth signal comprising a request for a change in a configuration; determine if the first BLE device is in a configuration-changes-enabled state; responsive to determining that the first BLE device is in a configuration-changes-enabled state, change the configuration based on the request; responsive to determining that the first BLE device is not in a configuration-changes-enabled state, refrain from changing the configuration; and the second device, configured to: successfully establish the Bluetooth connection with the first BLE device; and send the first Bluetooth signal comprising the request for the change in the configuration.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a computer readable medium and system for access control in Bluetooth® Low Energy (BLE) devices (BLUETOOTH is a registered trademark of Bluetooth SIG, Inc., Kirkland, Wash., USA). Specifically, after a Bluetooth® connection has been successfully established between two devices, a request for a change in a configuration is received. Subsequently, a determination is made whether the BLE device is in a configuration-changes-enabled state and, if the BLE device is in a configuration-change-enabled state then the configuration is changed per the request. Alternatively, if the BLE device is not in a configuration-change-enabled state then the request is ignored. Optionally, in one or more embodiments, a timer is started upon the establishment of the Bluetooth® connection. If the timer expires, the connection is terminated. However, if an access code or other key is received before the timer expires, then the timer may be canceled, thereby allowing the client device to stay connected with the BLE device for a longer period of time.

Throughout this detailed description, reference will be made to the Bluetooth® and BLE standards, as well as Bluetooth® and/or BLE devices. Bluetooth® is a standardized wireless technology for exchanging data over short distances (approximately 330 feet or less). Bluetooth® is a widely adopted standard with millions of Bluetooth® enabled devices in existence. Bluetooth® devices may include, but are not limited to: smartphones, speakers, watches, mice, keyboards, beacons, laptops, desktop computers, tablets, etc.

BLE is, in comparison to Bluetooth®, intended to provide greatly reduced power consumption while maintaining a similar communication range. BLE is ideal for devices that are powered by a small battery that may not even be rechargeable. In fact, BLE devices may be able to operate for months or even years on a single button cell, such as a watch battery. BLE devices may even be disposable. However, many more robust devices, such as smartphones (or any of the devices mentioned above when discussing Bluetooth®), may be able to use both Bluetooth® and BLE. BLE is not backwards compatible with Bluetooth®, however, although devices that support both Bluetooth® and BLE may use a single radio antenna.

When referring to BLE devices, a client is a device that initiates commands and requests, such as smartphone. A server is a device that receives commands and requests and returns responses, such as a beacon. A characteristic is a data value that is transferred between the client and/or server, such as battery power. A service is a grouping of related characteristics. Further specific, intricate details of how connections are established between devices, how messages are sent, and other aspects of the BLE standard are widely available in the published literature, and the details of such will not be repeated here.

Figure 1:
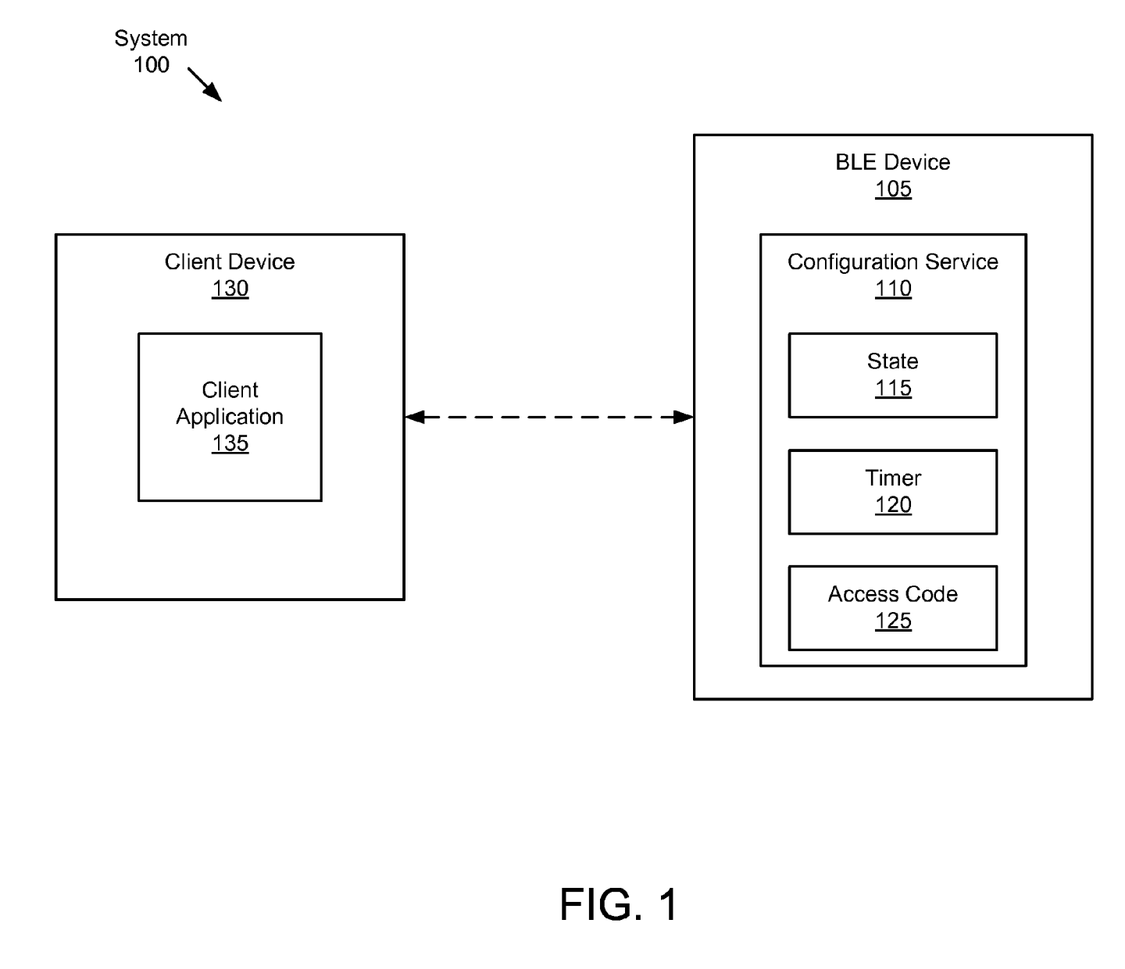
FIG. 1 shows a schematic diagram in accordance with one or more embodiments of the invention.

FIG. 1 shows a system (100) which includes a BLE device (105), a configuration service (110), a state (115), a timer (120), an access code (125), a client device (130), and a client application (135). In one or more embodiments, the BLE device (105) may be any device able to communicate using BLE. For example, the BLE device (105) may be, but is not limited to: a location beacon, temperature sensor, moisture sensor, disposable device, smartphone, desktop computer, laptop computer, tablet, etc. While not shown in FIG. 1, the BLE device (105) may include many different hardware components such as sensors, circuitry, antennas, batteries, processors, memory, hard drives, etc. As shown in FIG. 1, the BLE device (105) is communicatively connected to a client device (130). Although only one BLE device (105) is shown in FIG. 1, any number of BLE devices may be included in system (100).

In one or more embodiments of the invention, a BLE device (105) includes functionality to send advertising packets, establish a Bluetooth® connection, make changes to values/configurations, and execute a variety of services (such as the configuration service (110)) with various functionalities. The BLE device (105) may send advertising packets according to the BLE standard(s) in any manner now known or later developed. The advertising packets may, for example, provide data to nearby client devices (such as a smartphone) such as a map, information about an item/place of interest, etc. The advertising packets may be sent at set intervals, or in any other manner now known or later developed.

In one or more embodiments of the invention, the BLE device (105) includes functionality to establish a connection with another device, such as a client device (130), in any manner now known or later developed. When establishing a connection, many different messages may be sent back and forth, and a handshake process may be involved. In one or more embodiments of the invention, the BLE device (105) may stop sending advertising packets when a connection is established with a device. Alternatively, the advertising packets may continue to be sent. The BLE device (105) may be able to establish a connection with a single device at a time. In one or more embodiments, due to the increased volume of messages, establishing a connection with a device may rapidly drain the battery of the BLE device (105). By establishing a connection, the connecting device may be able to send messages to, and make changes to the configuration of, the BLE device (105). It will be apparent to one of ordinary skill in the art, having the benefit of this disclosure, that there are many different ways to establish a connection and many different actions may be performed once a connection is established and, as such, the invention should not be limited to the above examples.

In one or more embodiments, the BLE device (105) includes functionality to perform writes and/or change values/characteristics of the BLE device (105) in any manner now known or later developed, in accordance with the BLE standards. Any value or characteristic may be changed, pursuant to the access controls implemented via the configuration service (110). In one or more embodiments, the BLE device (105) includes functionality to execute services. The services may be of any type now known or later developed. For example, the services may be standardized services, such as the battery service as defined by the BLE standard. Alternatively, the services may be a customer service that may perform any functionality. In one or more embodiments of the invention, a BLE device (105) includes functionality to execute a configuration service (110).

In one or more embodiments, a configuration service (110) is a custom service for controlling access to the BLE device (105). The configuration service (110) includes any functionality needed for controlling access to the BLE device (105) as described below. In one or more embodiments, the configuration service (110) includes a state (115). In one or more embodiments, the state (115) is an internal state of a BLE device (105) that determines whether a connecting device is able to stay connected for longer than a minimum duration, make changes to the configuration of the BLE device (105), or any other aspect of access control. The state (115) may be set to any number of different settings, and multiple different states may exist within the configuration service (110). In one or more embodiments, a first state (115) is the "access allowed" state. The default value for "access allowed" is initialized to NO—meaning that a connecting device will not be allowed to connect for more than a predetermined amount of time without providing an access code (i.e., access code (125)). When any device connects, the value for "access allowed" is reset to NO. When the configuration service (110) receives an access code the value for "access allowed" is changed to YES—thereby allowing the connecting device to stay connected for a longer period of time. In one or more embodiments, the value for "access allowed" may reset after a predetermined amount of time even if an access code has been received. Alternatively, once an access code has been received the value of "access allowed" may not change until the connection is terminated.

In one or more embodiments, a second state (115) may be a "write access allowed" state. The "write access allowed" state must be a YES before any write operations will be accepted (i.e., before any changes may be made to any aspect of BLE device (105)). The default value for "write access allowed" is initialized to NO. When any device connects, the value for "write access allowed" is reset to NO. When the configuration service (110) receives an access code (i.e., access code (125)) the value for "write access allowed" is changed to YES—thereby allowing the connecting device to perform write actions on the BLE device (105). In one or more embodiments, the value for "write access allowed" may reset after a predetermined amount of time even if an access code has been received. Alternatively, once an access code has been received the value of "write access allowed" may not change until the connection is terminated.

In one or more embodiments of the invention, rather than multiple states there may be a single state. In other words, the "access allowed" state and the "write access allowed" state may be combined into a single state which, when set to YES, the connecting device will be allowed to stay connected for longer than a minimum amount of time and perform write actions. It will be apparent to one of ordinary skill in the art, having the benefit of this disclosure, that there may be any number of different states controlling access to a BLE device (105) and, as such, the invention should not be limited to the above examples.

In one or more embodiments, the timer (120) is a timer used by the configuration service (110). There may be any number of timers used by the configuration service (110). For example, a timer (120) may be started upon the successful establishment of a connection with a client device, and another timer may be started upon receiving an access code, performing a write, or any other suitable action. The timer (120) may be set to any suitable amount of time, such as 5 seconds, 10 seconds, 1 minute, 5 minutes, etc. Upon expiration of the timer(s) any suitable action may be performed, such as terminating the connection, changing a state, revoking write access, etc. It will be apparent to one of ordinary skill in the art, having the benefit of this disclosure, that there may be any number of timers and actions taken based on the timers and, as such, the invention should not be limited to the above examples.

In one or more embodiments, an access code (125) is a key that is written to a pre-determined characteristic of the configuration service (110) to unlock certain privileges such as staying connected to a BLE device (105), accessing write authority, etc. There may be any number of different access codes, and each may be of any suitable length. In one or more embodiments, an access code may be written to an "unlock-characteristic" of the configuration service (110), or to any other suitable characteristic. Different access codes may be written to the "unlock-characteristic." For example, a first access code may be written to the "unlock-characteristic" to allow the connection with the BLE device (105) to be maintained for longer than a minimum amount of time, while a second access code may be written to the "unlock-characteristic" to enable writes to be performed on the BLE device (105).

In one or more embodiments, a client device (130) is any device capable of connecting with a BLE device, such as a smartphone, tablet, desktop computer, laptop computer, etc. The client device (130) includes functionality to execute a client application (135). In one or more embodiments, the client application (135) is an application installed on the client device (130) for interacting with the configuration service (110). The client application (135) includes functionality for sending and/or receiving messages from the BLE device (300), or any other functionality needed to implement the invention. In one or more embodiments, the client application (135) may store the access codes necessary to unlock access to the BLE device (105), such as extending a timer for a connection beyond a minimum amount, performing writes, etc. Upon establishing a connection with a BLE device (105), the client application (135) may automatically write the proper access code to the "unlock-characteristic" or may prompt the user to determine whether or not to send the access code (125). It will be apparent to one of ordinary skill in the art, having the benefit of this disclosure, that there are many ways for the client application (135) to interact with the configuration service (110) and, as such, the invention should not be limited to the above examples.

Figure 2:
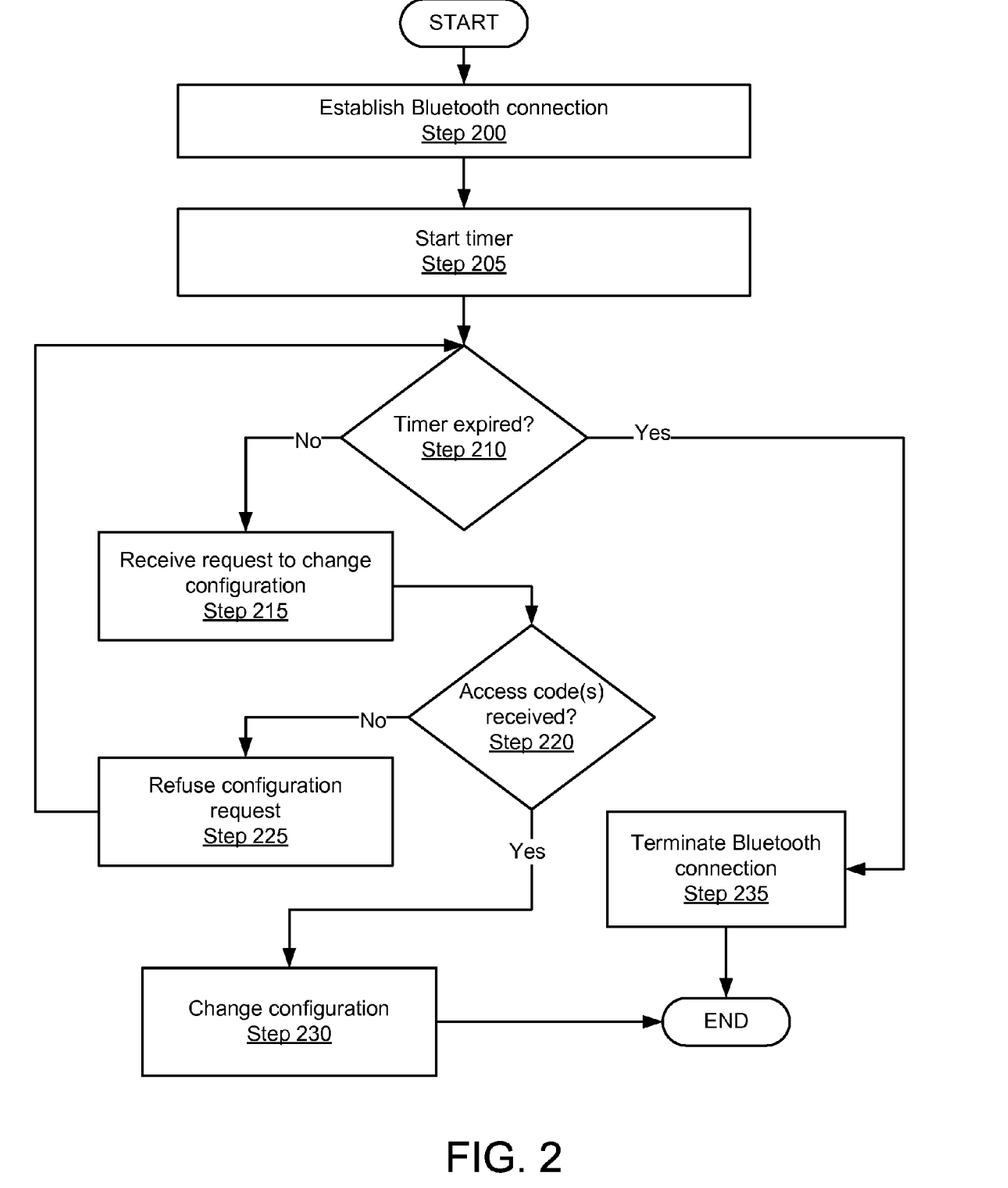
FIG. 2 shows a flowchart of a method in accordance with one or more embodiments of the invention.

FIG. 2 shows a flowchart of a method for access control in BLE devices. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In Step 200, a Bluetooth connection is established, in accordance with one or more embodiments. The Bluetooth® connection may be established in any manner now known or later developed, such as using the method(s) identified in the Bluetooth® or BLE standard(s). The connection may be between any two devices, such as a smartphone and a beacon.

In Step 205, a timer is started, in accordance with one or more embodiments. The timer may be started in response to the connection being established. In one or more embodiments, the timer is for limiting the duration that a client device may connect to a BLE device without providing an access code to cancel or extend the timer. The timer may be of any length, such as 10 seconds, 30 seconds, 2 minutes, etc.

In Step 210, a determination is made whether the timer is expired, in accordance with one or more embodiments. If the timer is expired the method proceeds to Step 235. If the timer is not expired the method proceeds to Step 215.

In Step 215, a request to change configuration is received, in accordance with one or more embodiments. The request may be received in any manner now known or later developed. The request may be to change any aspect, characteristic, or other item within the BLE device.

In Step 220, a determination is made whether an access code(s) has been received, in accordance with one or more embodiments. The access code(s) may be received from the connected client device, and may be received in any manner now known or later developed. In one or more embodiments, the access code(s) is written to an "unlock-characteristic" of a configuration service of the BLE device. In response to receiving an access code, any suitable action may be performed, such as canceling or extending a timer, changing a state (e.g., from write disabled to write enabled, etc.), etc. In one or more embodiments, multiple access codes may be needed to fully access the configuration of the BLE device. For example, a first access code may be needed to stop the timer and a second access code may be needed to enable write access. If the access code(s) has been received the method proceeds to Step 230. If the access code(s) has not been received the method proceeds to Step 225.

In Step 225, the configuration request is refused, in accordance with one or more embodiments. The configuration request may be refused in any manner now known or later developed, such as simply ignoring the request. The client device may not receive a message indicating that the request was ignored. Alternatively, the client device may receive a message indicating that the request was ignored. After Step 225, the method returns to Step 210. Optionally, in response to ignoring the request, the method may proceed to Step 235 and terminate the Bluetooth® connection.

In Step 230, the configuration is changed, in accordance with one or more embodiments. The configuration may be changed in any manner now known or later developed, such as the methods identified in the BLE standard.

In Step 235, the Bluetooth connection is terminated, in accordance with one or more embodiments. The connection may be terminated in any manner now known or later developed, such as the methods identified in the BLE standard.

The following section describes various examples of the invention. The examples are included to aid in the understanding of the invention and are not intended to limit the scope of the invention.

Figure 3A:
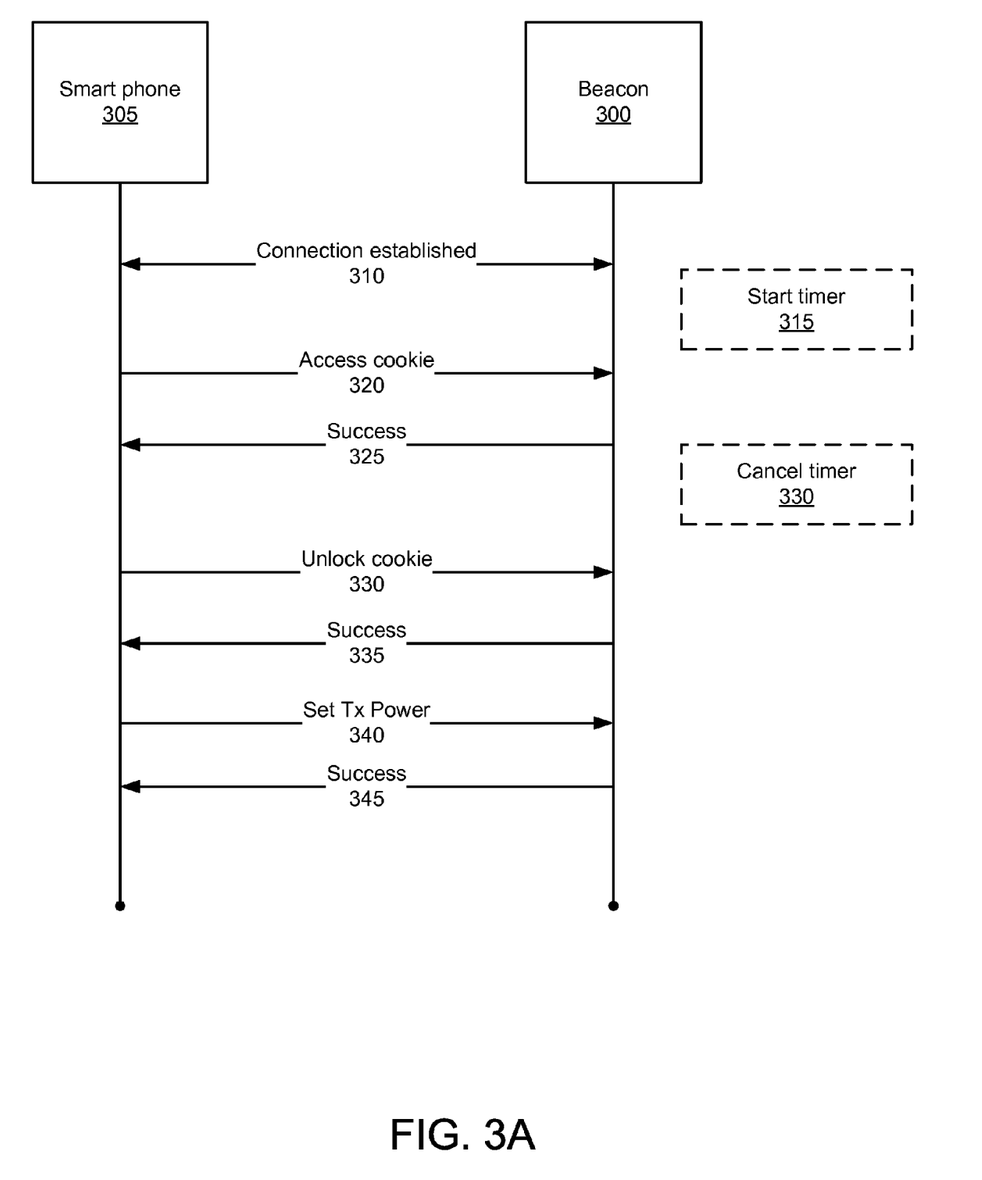
FIGS. 3A, 3B, and 3C show examples in accordance with one or more embodiments of the invention.
Figure 3B:
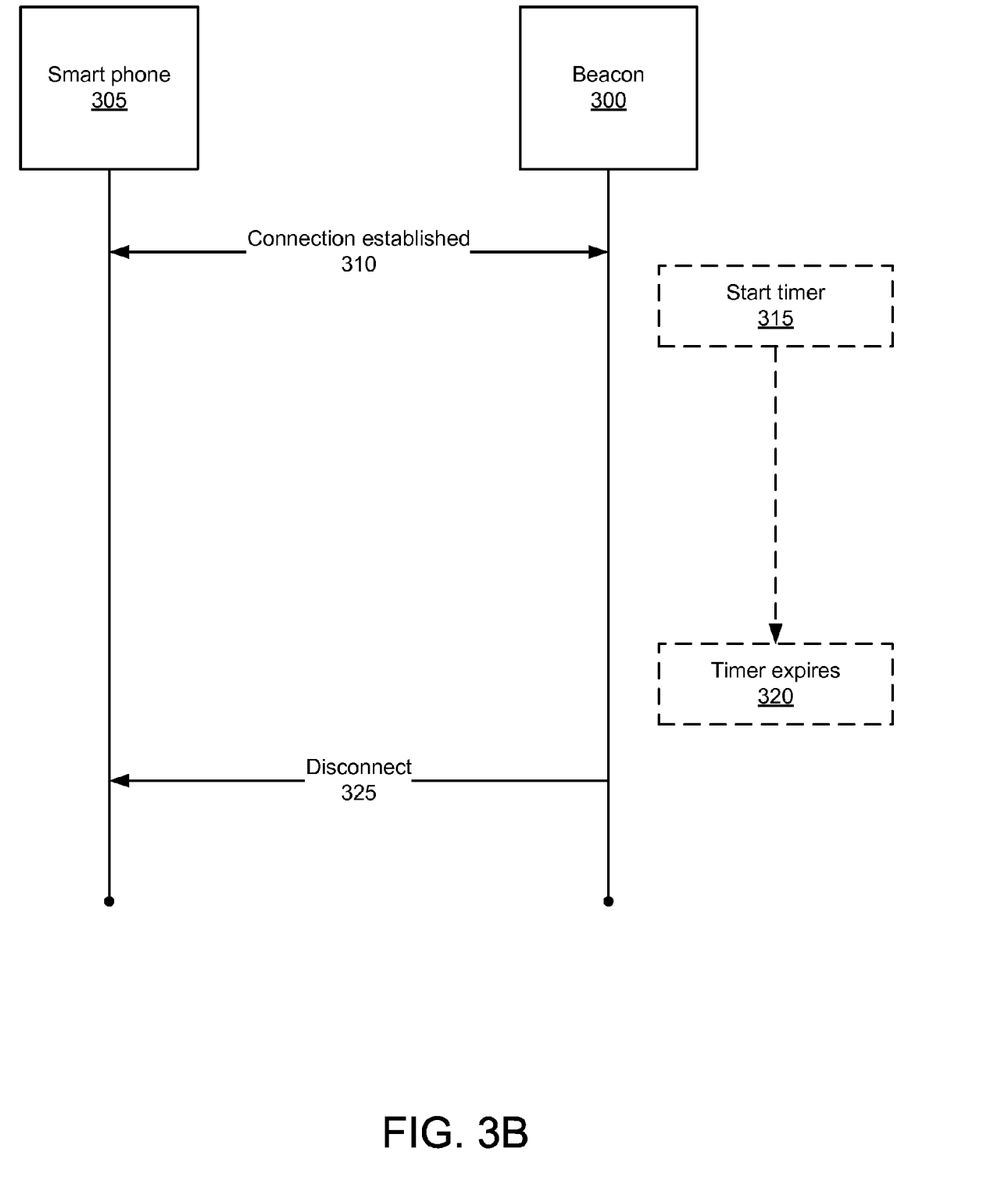
Figure 3C:
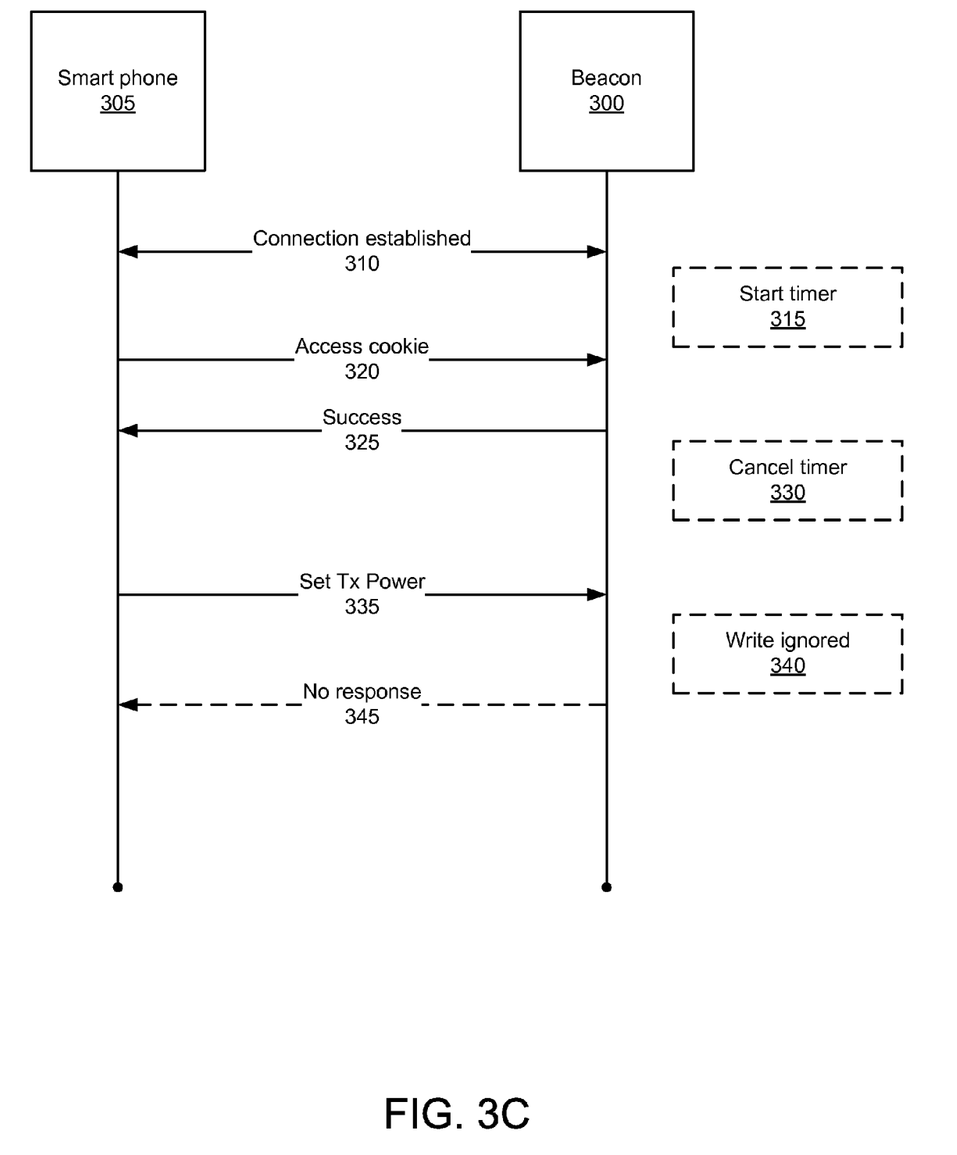

FIGS. 3A, 3B, and 3C show examples in accordance with one or more embodiments of the invention. In FIG. 3A, the example depicts the steps of successfully setting the "Tx Power" of a beacon (300). In this example, the beacon (300) is a beacon placed behind a display that provides information about the display to nearby devices. Initially, a connection is established (310) between the smart phone (305) and the beacon (300). After the connection is established, beacon (300) starts a timer (315). The timer (315) is short, only 10 seconds long, and the smart phone (305) needs to provide an access code before the timer expires. Thus, the smart phone (305) provides an access cookie (320) to beacon (300) prior to the timer expiring. The access cookie (320) is written to the "unlock-characteristic" of the beacon (300), and the state of beacon (300) is changed to allow a connection to persist longer than 10 seconds. The access cookie (320) cancels the timer (330), and the beacon (300) notifies the smart phone (305) that the access cookie (320) was successfully received (325). Subsequently, the smart phone (305) sends an unlock cookie (330) to beacon (300), so that write access will be granted. The unlock cookie (330) is also written to the "unlock-characteristic" of the beacon (300), and the state of beacon (300) is changed to a configuration-change-enabled state. The beacon (300) responds that the unlock cookie (330) was a success (335), and the smart phone (305) has now been granted the authority to write changes to the configuration and settings of beacon (300). Thus, smart phone (305) then sends a message to set "Tx Power" (340) of beacon (300) to a desired level. After checking to ensure that beacon (300) is in the configuration-change-enabled state, beacon (300) makes the desired changes to "Tx Power," and respond to smart phone (305) that the configuration changes was a success (345).

FIG. 3B shows an example of a timer expiring due to not receiving an access code. As in FIG. 3A, a connection is established (310) between smart phone (305) and beacon (300), at which point a timer is started (315). The timer in this example is also short—15 seconds. However, as the timer counts down no access code is written to the unlock characteristic of beacon (300). Thus, the timer expires (320) and in response to the expiration the beacon (300) disconnects (325) the smart phone (305). This timer ensures that no one device may unnecessarily occupy the connection of the beacon, and limits the battery usage, as maintaining a connection is highly draining on the battery.

FIG. 3C shows an example of ignoring a configuration request. As in FIGS. 3A and 3B, initially a connection is established (310) between smart phone (305) and beacon (300), and the timer is started (315). Again the timer is short seconds. However, access cookie (320) is written to the unlock characteristic of beacon (300) before the expiration of the timer, and thus beacon (300) cancels the timer (330) and sends a notification that the access cookie was successful (325). Subsequently, smart phone (305) sends a request to set "Tx Power" (335). However, an access code has not been received by beacon (300) and thus the beacon is not in a configuration-changes-enabled state and the write is ignored (340). No response (345) is sent by beacon (300) notifying smart phone (305) of the failure to change the configuration setting.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 4:
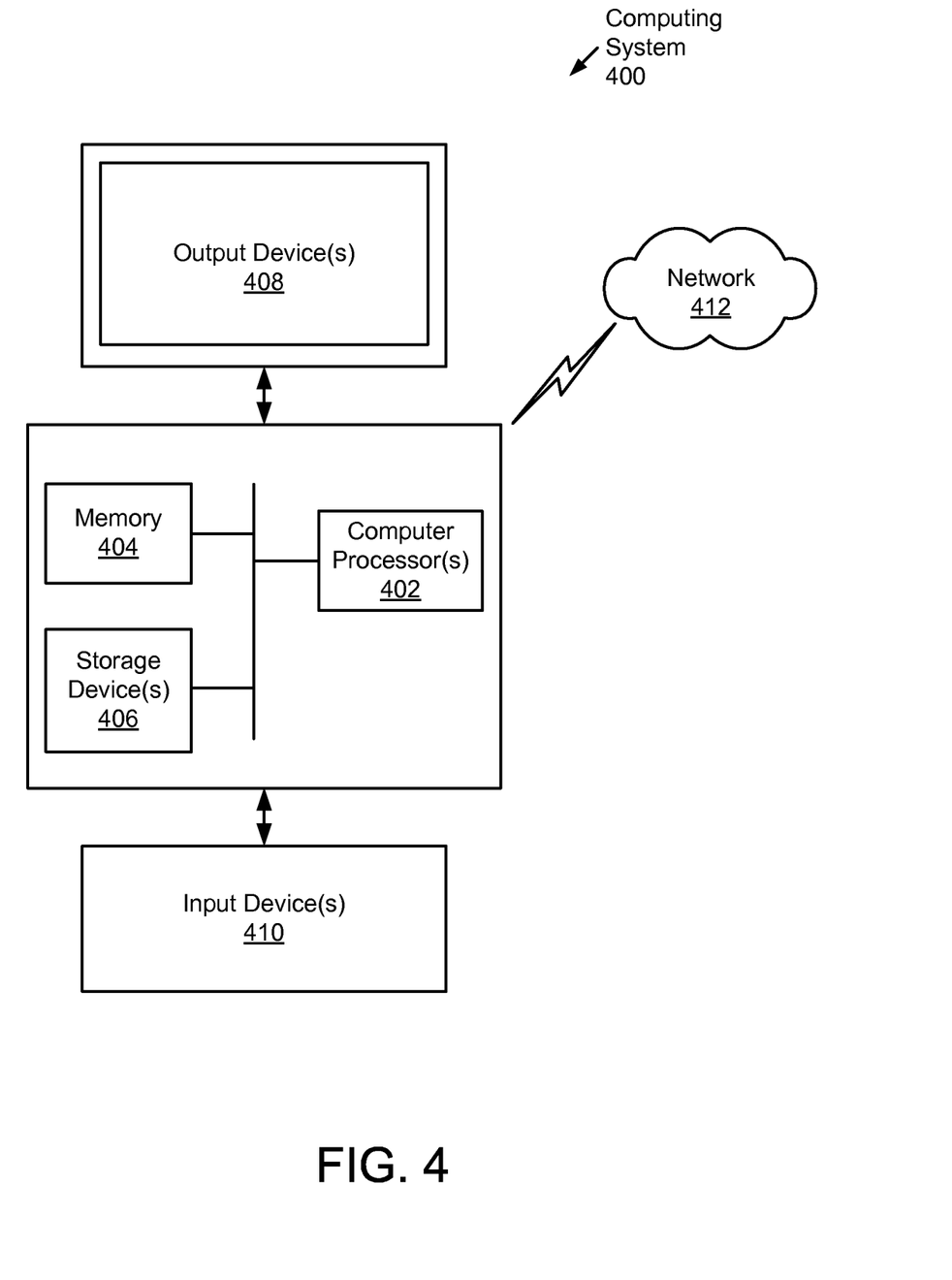
FIG. 4 shows a computer system in accordance with one or more embodiments of the invention.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor (s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (412) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (412). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions which, when executed by a hardware processor, causes performance of operations comprising:

establishing a Bluetooth connection between a Bluetooth Low Energy (BLE) beacon and a BLE device;

determining, by the BLE beacon, if the BLE beacon is in a configuration-changes-enabled state that enables configuration write access by the BLE device;

responsive to determining that the BLE beacon is in a configuration-changes-enabled state, sending a notification from the BLE beacon to the BLE device that the BLE beacon is in the configuration-changes-enabled state;

receiving, by the BLE beacon from the BLE device, a request for a change in a configuration of the BLE beacon in response to receipt of the notification;

responsive to receiving the request, changing the configuration based on the request; and responsive to determining that the BLE beacon is not in a configuration-changes-enabled state, refraining from changing the configuration.

2. The medium of claim 1, wherein the operations further comprise: prior to receiving the request:

receiving, by the BLE beacon a particular code from the BLE device while the BLE beacon is in a configuration-changes-disabled state;

determining that the particular code is valid for setting the configuration-changes-enabled state; responsive to determining that the particular code is valid: modifying the configuration-changes-disabled state to the configuration-changes-enabled state.

3. The medium of claim 2, wherein modifying the configuration-changes-disabled state to the configuration-changes-enabled state is further responsive to determining that the particular code is received from the BLE device within a particular period of time from establishing the Bluetooth connection between the BLE beacon and the BLE device.

4. The medium of claim 1, wherein the BLE beacon is to exchange messages with the BLE device when the BLE beacon is in the configuration-changes-enabled state and when the BLE beacon is not in the configuration-changes-enabled state.

5. A non-transitory computer readable medium comprising instructions which, when executed by a hardware processor, causes performance of operations comprising:

establishing a Bluetooth connection between a Bluetooth Low Energy (BLE) beacon and a BLE device;

responsive to determining that a particular access code is received within a particular period of time from establishing the Bluetooth connection: at least temporarily maintaining the Bluetooth connection;

responsive to determining that the particular access code is received within the particular period of time, sending a notification from the BLE beacon to the BLE device that the BLE beacon is in a configuration-changes-enabled state that enables configuration write access by the BLE device;

receiving, by the BLE beacon from the BLE device, a request for a change in a configuration of the BLE beacon;

responsive to receiving the request, changing the configuration of the BLE beacon; and responsive to determining that the particular access code is not received within the particular period of time from establishing the Bluetooth connection: terminating, by the BLE beacon, the Bluetooth connection between the BLE beacon and the BLE device.

6. The medium of claim 5, wherein the operation further comprise: responsive to determining that the particular access code is received within the particular period of time, extending or initiating a timer for the terminating of the Bluetooth connection.

7. The medium of claim 5, wherein determining that the particular access code is received within the particular period of time comprises determining that the particular access code is received before expiration of a time that was initiated upon establishing the Bluetooth connection.

8. The medium of claim 7, wherein the operations further comprise, responsive to determining that the particular access code is received before expiration of the timer, stopping the timer.

9. The medium of claim 7, wherein the operations further comprise, responsive to determining that the particular access code is received before expiration of the timer, storing information indicating that the Bluetooth connection is authorized.

10. A system comprising:

a Bluetooth Low Energy (BLE) beacon configured to:
establish a Bluetooth connection with a BLE device;
determine if the BLE beacon is in a configuration-changes-enabled state that enables configuration write access by the BLE device;
responsive to determining that the BLE beacon is in the configuration-changes-enabled state, sending a notification to the BLE device that the BLE beacon is in a configuration-changes-enabled state;
responsive to receiving a request from the BLE device, change the configuration based on the request;
responsive to determining that the BLE beacon is not in a configuration-changes-enabled state, refrain from changing the configuration; and the BLE device, configured to:
establish the Bluetooth connection with the BLE beacon;
receive the notification from the BLE beacon; and
send, in response to receipt of the notification, a first Bluetooth signal comprising the request for the change in the configuration of the BLE beacon.

11. The system of claim 10, wherein the BLE beacon is further configured to: prior to receiving the request:
receive a particular code from the BLE device while in a configuration-changes-disabled state;
determine that the particular code is valid for setting the configuration-changes-enabled state; and
responsive to determining that the particular code is valid: modify the configuration-changes-disabled state to the configuration-changes-enabled state.

12. The system of claim 11, wherein modifying the configuration-changes-disabled state to the configuration-changes-enabled state is further responsive to the determining that the particular code is received from the BLE device within a particular period of time from successfully establishing the Bluetooth connection between the BLE beacon and the BLE device.

13. The system of claim 10, wherein the BLE beacon is configured to exchange messages with the BLE device when the BLE beacon is in the configuration-changes-enabled state and when the BLE beacon is not in the configuration-changes-enabled state.

14. The system of claim 10, wherein the BLE beacon is further configured to:

responsive to determining that a particular access code is received within a particular period of time from establishing the Bluetooth connection: at least temporarily maintain the Bluetooth connection;

responsive to determining that the particular access code is not received within the particular period of time from establishing the Bluetooth connection: terminate the Bluetooth connection between the BLE beacon and the BLE device.

15. The system of claim 14, the BLE beacon is further configured to:
responsive to determining that the particular access code is received within the particular period of time, extend or initiate a timer for the termination of the Bluetooth connection.

16. The system of claim 14, wherein determining that the particular access code is received within the particular period of time comprises determining that the particular access code is received before expiration of a timer that was initiated upon establishing the Bluetooth connection.

17. The system of claim 16, wherein the BLE beacon is further configured to:
responsive to determining that the particular access code is received before expiration of the timer, stop the timer.

18. The system of claim 16, wherein the BLE beacon is further configured to:
responsive to determining that the particular access code is received before expiration of the timer, store information indicating that the Bluetooth connection is authorized.

* * * * *